(12) United States Patent
Kim et al.

(10) Patent No.: US 9,133,361 B2
(45) Date of Patent: Sep. 15, 2015

(54) PHOTOCURABLE COATING COMPOSITION

(75) Inventors: Cheoul Young Kim, Suwon-si (KR); Hyun Surk Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 513 days.

(21) Appl. No.: 12/642,287

(22) Filed: Dec. 18, 2009

(65) Prior Publication Data

US 2010/0280144 A1 Nov. 4, 2010

(30) Foreign Application Priority Data

Apr. 29, 2009 (KR) ........................ 10-2009-0037771

(51) Int. Cl.
C09D 4/00 (2006.01)
C09D 133/14 (2006.01)
C08L 75/04 (2006.01)
C09D 133/06 (2006.01)

(52) U.S. Cl.
CPC ................ C09D 133/06 (2013.01); C09D 4/00 (2013.01); C09D 133/14 (2013.01); C08L 75/04 (2013.01)

(58) Field of Classification Search
USPC ............. 522/90, 96, 104, 107, 113, 114, 120, 522/121, 116, 150, 151, 152, 153, 173, 174, 522/178, 182
See application file for complete search history.

(56) References Cited

U.S. PATENT DOCUMENTS

| 5,420,171 | A | * | 5/1995 | Unruh | 522/44 |
|---|---|---|---|---|---|
| 6,114,408 | A | * | 9/2000 | Dickens | 522/182 |
| 6,206,959 | B1 | * | 3/2001 | Dickens | 106/35 |
| 6,210,759 | B1 | * | 4/2001 | Dickens | 427/516 |
| 6,419,873 | B1 | * | 7/2002 | Buazza et al. | 264/496 |
| 7,419,715 | B2 | * | 9/2008 | Hegi et al. | 428/147 |
| 2004/0030081 | A1 | * | 2/2004 | Hegi et al. | 526/319 |
| 2009/0156747 | A1 | * | 6/2009 | Lu et al. | 525/221 |

FOREIGN PATENT DOCUMENTS

WO WO 2007/094953 8/2007

OTHER PUBLICATIONS

RSCC Aerospace and Defense. Polymer Crosslinking.[online], 2009, [retrieves on May 3, 2014]. Retrieved online the Internet:<URL:http://web.archive.org/web/20090914084336/http://www.rsccaerodefense.com/polymer-cross-linking.php>.*

* cited by examiner

*Primary Examiner* — Sanza McClendon
(74) *Attorney, Agent, or Firm* — Staas & Halsey LLP (57) ABSTRACT

Disclosed is a photocurable coating composition for an optical product, wherein the photocurable coating composition includes a (meth)acryloyl monomer, a (meth)acryloyl oligomer, an organic solvent and a diluted monomer, which provides heat resistance, storage stability and high light transmission while having a low viscosity sufficient to prevent discoloration of the optical product.

14 Claims, 6 Drawing Sheets

PHOTOCURABLE COATING COMPOSITION

CROSS-REFERENCE TO RELATED APPLICATION

This application claims the benefit of Korean Patent Application No. 10-2009-0037771, filed on Apr. 29, 2009 with the Korean Intellectual Property Office, the disclosure of which is hereby incorporated by reference in its entirety for all purposes.

TECHNICAL FIELD

The disclosure generally relates to photocurable coating compositions for optical products, and, more particularly, to photocurable coating compositions that include a (meth)acryloyl monomer, a (meth)acryloyl oligomer, an organic solvent and a diluted monomer.

BACKGROUND OF RELATED ART

Polymeric materials are used in a variety of optical products due to their being lightweight and inexpensive to produce. Polycarbonates, for example, are characterized by excellent clarity, resistance to discoloration, high strength and high impact resistance.

Most polymers are synthesized by either a thermal or photocuring process. Variations in these curing processes may influence the performance of the prepared polymer. For example, thermal polymerization may be accompanied by high shrinkage during cure, for example, in the range of from about 10 to about 20%, and extended curing times, for example, in the range of from about 5 to about 16 hours or more. The high shrinkage levels create difficulties in the production of precision optics such as lenses or prisms, particularly in the production of articles having larger thicknesses or large differences in thickness between the center and the edges of the article. The extended cure times tie up production facilities, and may lead to inefficient utilization of the dies in which the articles are molded. Also, the thermal cure cycle used to polymerize the monomer consumes large amounts of energy, and may thermally stresses the dies.

With respect to the photocuring process, polymeric reactions may be initiated by irradiation at a wavelength of about 780 nm or less, especially, in the range of the ultraviolet (UV) spectra, for example, in the range of from about 10 to about 380 nm. These reactions progress rapidly to form numerous chains between the monomers and/or oligomers. Owing to characteristics of this reaction, it may not be possible to determine the precise molecular weight of the polymer obtained by photocuring, as well as the glass transition temperature (Tg). However, increasing the molecular weight of a polymeric material generally improves the density, and may thereby enhances the toughness and hardness of the material.

High molecular weight polymers may be formed into optical products by either an injection or extrusion process. Optical products prepared by these processes however may have certain disadvantages such as, for example, shrinkage after polymerization; cracking caused by temperature and/or moisture variations; expansion due to moisture absorption resulting in reduced birefringence, and so forth. As an increasing number of polymeric electronic products are manufactured employing high intensity light, the heat (with a temperature in the range of from about 60 to about 160° C.) to which those parts directly in contact with the light source are subjected may cause problems such as reduced dimensional stability and surface aging. Also, optical products that are stored and operated under conditions of high temperature and high humidity (for example more than about 40° C. and 75% RH) experience a shortened lifespan. Thus, there remains a need in the art for improved polymeric materials for use in optical products.

SUMMARY OF THE DISCLOSURE

One or more aspects of the present disclosure provide photocurable coating compositions and processes for their preparation and use, wherein the photocurable coating compositions comprise a (meth)acryloyl monomer, a (meth)acryloyl oligomer, an organic solvent and diluted monomer, and may further include a photo-initiator.

Thus, according to one embodiment the disclosure provides a photocurable coating composition including: (a) about 70 to about 99 parts by weight of a (meth)acryloyl monomer; (b) about 1 to about 30 parts by weight of a (meth) acryloyl oligomer; (c) about 1 to about 99 parts by weight of a mixture of an organic solvent and a diluted monomer based on 100 parts by weight of (a) and (b); and (d) about 0.001 to about 5 parts by weight of a photo-initiator based on 100 parts by weight of (a), (b) and (c).

In another embodiment the disclosure provides a photocurable coating composition, wherein the (meth)acryloyl oligomer comprises a polymerized monomer unit including: (a) about 50 to about 99 parts by weight of a (meth)acryloyl monomer unit that is homo-polymerizable to a polymer having a Tg of not less than about 10° C.; (b) about 1 to about 50 parts by weight of a monomer unit having a pendent, free-radically polymerizable functional group; and (c) more, than 0 parts by weight and less than about 40 parts by weight of a monomer unit that is homo-polymerizable to a polymer having a Tg of less than about 40° C., based on 100 parts by weight of (a) and (b).

In another embodiment the disclosure provides a photocurable coating composition, wherein the (meth)acryloyl oligomer is homo-polymerizable to a small polymer having a Tg of not less than 10° C.

In another embodiment the disclosure provides a photocurable coating composition including: (a) about 70 to about 99 parts by weight of a (meth)acryloyl monomer and urethane monomer mixture; (b) about 1 to about 30 parts by weight of a (meth)acryloyl oligomer and urethane oligomer or acryl-urethane copolymerized oligomer; (c) about 1 to about 99 parts by weight of a mixture comprising an organic solvent and a diluted monomer based on 100 parts by weight of (a) and (b); and (d) about 0.001 to about 5 parts by weight of photo-initiator based on 100 parts by weight of (a), (b) and (c).

In another embodiment the disclosure provides a photocurable coating composition wherein the (meth)acryloyl oligomer and urethane oligomer or acryl-urethane copolymerized oligomer includes a polymerized monomer unit including: (a) about 50 to about 99 parts by weight of a (meth)acryloyl monomer unit and urethane monomer unit, both being homo-polymerizable to a polymer having a Tg of not less than 10° C.; (b) about 1 to about 50 parts by weight of a monomer unit having a pendent, free-radically polymerizable functional groups; and (c) more than 0 parts by weight and less than 40 parts by weight of a monomer unit that is homo-polymerizable to a polymer having a Tg of less than 40° C., based on 100 parts by weight of (a) and (b).

In another embodiment the disclosure provides a photocurable coating composition wherein the (meth)acryloyl oligomer, the urethane oligomer, the (meth)acryloyl oligomer and urethane oligomer, or the acryl-urethane copolymerized oligomer is homo-polymerizable to a small polymer having a Tg of not less than 10° C.

In another embodiment the disclosure provides a photocurable coating composition wherein the composition has a viscosity of less than 20 mPa·s at about 18 to about 20° C.

In another embodiment the disclosure provides a photocurable coating composition that has one of the following properties when cured: shrinkage of less than 10% by volume; birefringence of less than $1\times10^{-4}$; Tg of not less than 60° C.; CIELAB b*value of less than 1.6; refractive index of 1.30 to 1.70; light transmittance of not less than 80%; and light transmittance of not more than 5% when the composition is left at ambient temperature or an operating temperature of 70 to 120° C. and a relative humidity of not less than 65% RH for 96 hours.

In another embodiment the disclosure provides a photocurable coating composition, wherein the amount of the mixture comprising the organic solvent and the diluted monomer may be in the range of from about 30 to about 70 parts by weight based on 100 parts by weight of (a) and (b).

In another embodiment the disclosure provides a photocurable coating composition, wherein the organic solvent has a molecular weight of not more than 500 g/mole.

In another embodiment the disclosure provides a photocurable coating composition, wherein the monomer unit having a pendent, free-radically polymerizable functional group is prepared by reacting a monomer unit having a reactive pendant functional group with a monoethylenically-unsaturated compound having a co-reactive functional group.

In another embodiment the disclosure provides a photocurable coating composition, wherein the reactive pendant functional group is hydroxyl, secondary amino, oxazolinyl, oxazolonyl, acetylacetonyl, carboxyl, isocyanato, epoxy, aziridinyl, icyloyl halide or cyclic anhydride.

In another embodiment the disclosure provides a photocurable coating composition, including about 1 to about 10 parts by weight of free-radically polymerizable cross-linking agent based on 100 parts by weight of the photocurable coating composition.

In another embodiment the disclosure provides a photocurable coating composition, wherein the cross-linking agent is divinylbenzene, triarylisocyanurate, triarylcyanurate, arylmethacrylate or ethyleneglycol dimethylacrylate.

In another embodiment the disclosure provides a light guide having at least one face coated with the photocurable coating compositions as disclosed herein.

The disclosed photocurable coating compositions provide a curable material useful for coating precision optical products and/or electronic displays. The curable material has good optical transparency without blushing, a low amount of shrinkage, and minimal residual stress and/or birefringence.

The disclosed photocurable coating compositions show good heat resistance and storage stability, while providing high transmittance with non-discoloration. In addition, the photocurable coating compositions may contain a (meth) acryloyl monomer, an organic solvent and a diluted monomer in large amounts so as to provide low viscosity compositions.

BRIEF DESCRIPTION OF THE DRAWINGS

Various aspects and/or features of the present disclosure will become apparent and more readily appreciated from the following description of several embodiments, taken in conjunction with the accompanying drawings of which.

DETAILED DESCRIPTION OF THE DISCLOSURE

According to an embodiment the present disclosure, a photocurable coating composition may be provided to include: (a) about 70 to about 99 parts by weight of a (meth)acryloyl monomer; (b) about 1 to about 30 parts by weight of a (meth) acryloyl oligomer; (c) about 1 to about 99 parts by weight of a mixture of an organic solvent and a diluted monomer based on 100 parts by weight of (a) and (b); and (d) about 0.001 to about 5 parts by weight of a photo-initiator based on 100 parts by weight of (a), (b) and (c).

In another embodiment, a photocurable coating composition may be provided, wherein the (meth)acryloyl oligomer comprises a polymerized monomer unit including: (a) about 50 to about 99 parts by weight of a (meth)acryloyl monomer unit that is homo-polymerizable to a polymer having a Tg of not less than about 10° C.; (b) about 1 to about 50 parts by weight of a monomer unit having a pendent, free-radically polymerizable functional group; and (c) more than 0 parts by weight and less than about 40 parts by weight of a monomer unit that is homo-polymerizable to a polymer having a Tg of less than about 40° C., based on 100 parts by weight of (a) and (b).

In another embodiment, a photocurable coating composition may be provided, wherein the (meth)acryloyl oligomer is homo-polymerizable to a small polymer having a Tg of not less than 10° C.

Photocurable coating compositions according to one or more embodiments of the present disclosure may include one or more (meth)acryloyl monomers. As used herein, a (meth) acryloyl monomer refers to both an acryloyl monomer and/or a methacryloyl monomer, which includes the acrylate, methacrylate, acrylamide and/or the methacrylamide monomers. A (meth)acryloyl monomer contains at least one free-radically polymerizable group. Thus, if there is a photo-initiator present, free-radical polymerization may be induced in the (meth)acryloyl monomers.

As used herein, (meth)acryloyl monomers may include but are not limited to: acrylate or methacrylate monomers having substituents such as methyl, ethyl, propyl, butyl, pentyl, hexyl, amyl, 2-ethylhexyl, octyl, nonyl, dodecyl, isodecyl, lauryl, hexadecyl, cyclohexyl, benzyl, methoxyethyl, ethoxyethyl, butoxyethyl, phenoxyethyl, allyl, meta-allyl, glycidyl, 2-hydroxyethyl, 2-hydroxypropyl, 3-chloro-2-hydroxypropyl, dimethylaminohexyl, diethylaminohexyl, isobornyl, and the like; and multi-functional acrylate and/or methacrylate monomers and derivatives thereof such as ethyleneglycol, diethyleneglycol, triethyleneglycol, propyleneglycol, tripropyleneglycol, butyleneglycol, tetramethyleneglycol, hexamethyleneglycol, neopentylglycol, butanedione, hexanediol, trimethylolpropane, pentaerythritol, dipentaerythritol, and the like, however, the (meth)acryloyl monomers are not limited thereto. The disclosed photocurable coating compositions may include one or more (meth)acryloyl monomers selected from any of the monomers described above.

The photocurable coating compositions according to an embodiment of the present disclosure may also include one or more (meth)acryloyl oligomers. The (meth)acryloyl oligomer may include a polymerized monomer unit comprising: (a) about 50 to about 99 parts by weight of (meth)acryloyl monomer unit that is homo-polymerizable to a polymer having a Tg of not less than about 10° C.; (b) about 1 to about 50 parts by weight of a monomer unit having a pendent, free-radically polymerizable functional groups; and (c) more than 0 parts by weight and less than about 40 parts by weight of a monomer unit that is homo-polymerizable to a polymer having a Tg of less than about 40° C., based on 100 parts by weight of (a) and (b).

When a single monomer is polymerized into a macromolecule, the product is called a homopolymer. On the other hand, copolymers are made from two or more monomers.

The (meth)acryloyl oligomers according to one or more embodiments may contain a homo-polymerizable monomer, which provides a polymer having a Tg of not less than 10° C. Examples of such monomers include but are not limited to acrylate and/or methacrylate monomers having substituents such as methyl, ethyl, propyl, butyl, pentyl, hexyl, amyl, 2-ethylhexyl, octyl, nonyl, dodecyl, isodecyl, lauryl, hexadecyl, cyclohexyl, benzyl, methoxyethyl, ethoxyethyl, butoxyethyl, phenoxyethyl, allyl, meta-allyl, glycidyl, 2-hydroxyethyl, 2-hydroxypropyl, 3-chloro-2-hydroxypropyl, dimethylaminohexyl, diethylaminohexyl, isobornyl, and the like; and multi-functional acrylate and/or methacrylate monomers and derivatives thereof such as ethyleneglycol, diethyleneglycol, triethyleneglycol, propyleneglycol, tripropyleneglycol, butyleneglycol, tetramethyleneglycol, hexamethyleneglycol, neopentylglycol, butanediol, hexanediol, trimethylolpropane, pentaerythritol, dipentaerythritol, and the like, however, the monomers are not limited thereto.

The (meth)acryloyl oligomers according to one or more embodiments may be homo-polymerizable to a small polymer having a Tg of not less than 10° C.

The (meth)acryloyl oligomers according to one or more embodiments may have at least one pendant group including a free-radically polymerizable unsaturated group. The pendant unsaturated groups may contain (meth)acryloyl groups including (meth)acryloxy; and (meth)acrylamide.

The pendant group may be introduced into the (meth)acryloyl oligomer by combining di(meth)acrylate, 1,6-hexanediol diacrylate or bisphenol-A di(meth)acrylate into an ethylene monomer unit. Alternatively, a pendant group comprising a polymerizable unsaturated group, which has a reactive functional group in a monomer unit of a polymer, may be introduced into the oligomer. The reactive functional groups include but are not limited to hydroxyl, amino, oxazolonyl, oxazolinyl, acetoacetyl, carboxyl, isocyanato, epoxy, aziridinyl, acyl halide, cyclic anhydride, and mixtures thereof, however, the present disclosure is not limited thereto. The reactive pendant functional group reacts with an unsaturated compound having a co-reactive functional group to produce an oligomer having a pendant unsaturated group.

The compound having the co-reactive functional group may include, for example, a hydroxylalkyl a (meth)acrylate, an aminoalkyl(meth)acrylate, an oxazolinyl compound, a carboxy-substituted compound, an isocyanate substituted compound, an epoxy-substituted compound, an aziridinyl-substituted compound and/or an acryloyl halide, however the present disclosure is not limited thereto.

The ethylenically unsaturated monomer having a free-radically polymerizable group may induce free-radical polymerization with a cross-linking agent and a reactive diluent. The reaction between functional groups provide a crosslink by forming covalent bonds through free-radical addition reactions.

The (meth)acryloyl oligomer according to one or more embodiments of the present disclosure may contain less than 40 parts by weight of a monomer unit that is homo-polymerizable to a polymer having a Tg of less than 40° C. The monomer may include, for example, 3,5-dimethyladamantyl (meth)acrylate, isobornyl(meth)acrylate, 4-biphenyl (meth)acrylate, phenyl(meth)acrylate, benzyl methacrylate, 2-naphthyl (meth)acrylate, dicyclopentadienyl (meth)acrylate, and the like, however, the present disclosure is not limited thereto.

In another embodiment of the present disclosure, a photocurable coating composition may be provide, wherein the (meth)acryloyl oligomer, the urethane oligomer, the (meth)acryloyl oligomer and urethane oligomer, or the acryl-urethane copolymerized oligomer is homo-polymerizable to a small polymer having a Tg of not less than 10° C.

In another embodiment of the present disclosure, a photocurable coating composition may include: (a) about 70 to about 99 parts by weight of a (meth)acryloyl monomer and urethane monomer mixture; (b) about 1 to about 30 parts by weight of a (meth)acryloyl oligomer and urethane oligomer or acryl-urethane copolymerized oligomer; (c) about 1 to about 99 parts by weight of a mixture comprising an organic solvent and a diluted monomer based on 100 parts by weight of (a) and (b); and (d) about 0.001 to about 5 parts by weight of photo-initiator based on 100 parts by weight of (a), (b) and (c).

In another embodiment of the present disclosure, a photocurable coating composition may be provided, wherein the (meth)acryloyl oligomer and urethane oligomer or acryl-urethane copolymerized oligomer includes a polymerized monomer unit including: (a) about 50 to about 99 parts by weight of a (meth)acryloyl monomer unit and urethane monomer unit, both being homo-polymerizable to a polymer having a Tg of not less than 10° C.; (b) about 1 to about 50 parts by weight of a monomer unit having a pendent, free-radically polymerizable functional groups; and (c) more than 0 parts by weight and less than 40 parts by weight of a monomer unit that is homo-polymerizable to a polymer having a Tg of less than 40° C., based on 100 parts by weight of (a) and (b).

The urethane monomer may comprise a cross-linkable monomer having an ethylene based double bond. The urethane monomer include but are not limited to 1,4-butadiol diacrylate, 1,3-butyleneglycol diacrylate, ethyleneglycol diacrylate, pentaerythritol tetraacrylate, triethyleneglycol diacrylate, polyethyleneglycol diacrylate, dipentaerythritol diacrylate, sorbitol triacrylate, trimethylpropane triacrylate, dipentaerythritol polyacrylate, and mixtures thereof, however, the present disclosure is not limited thereto.

The acryl-urethane copolymerized oligomer may react with a polar group in a side chain as well as a cross-linking agent to form a cross-linked structure. The cross-linked structure acts to enhance the binding effects of the constitutional ingredients, increase film toughness, surface hardness and/or solvent resistance. A monomer that may be useful in the formation of an acryl-urethane copolymerized oligomer having a polar group in side chain is not limited so long as the monomer has a polar group such as a carboxyl, hydroxyl, epoxy, or amide group, and the like.

Each of the (meth)acryloyl oligomer, urethane oligomer, (meth)acryloyl oligomer and urethane oligomer, and/or acryl-urethane copolymerized oligomer used in the disclosed photocurable coating compositions may be homo-polymerizable to a small polymer having a Tg of not less than 10° C.

The described oligomers may be prepared by radical polymerization by combining an initiator with a monomer in the presence of a chain transfer agent. In this reaction, the chain transfer agent transfers the active site on one growing chain to another molecule that can then start a new chain. The chain transfer agent may be used to control the molecular weight of the oligomer. Examples of chain transfer agents include but are not limited to halogenated hydrocarbons, sulfur compounds, and the like.

The photocurable coating compositions according to one or more embodiments of the present disclosure may also contain an organic solvent. The viscosity of the compositions may be lowered in accordance with the intended use by the addition of suitable organic solvents. If the molecular weight is less than about 500 g/mole, the organic solvent has high volatility and functions to decrease the viscosity of the photocurable coating composition. As examples of solvents useful for lowering the viscosity, one or more of alcohols, aromatics, esters, ethers, ketones, and the like may be used. For example, ethyl alcohol, acetone, toluene, xylene or the like may be used depending on the base material. Mixed solvents such as ethyl alcohol, isopropyl alcohol, toluene and the like may also be used.

The molecular weight of the organic solvent may be about 500 g/mole or less. If the molecular weight is less than about 500 g/mole, the organic solvent has high volatility and functions to decrease the viscosity of the photocurable coating composition. Examples of organic solvents include but are not limited to ketone compounds, alcohol compounds, acetate compounds and/or aromatic compounds, and the like.

The photocurable coating compositions according to one or more embodiments of the present disclosure may also contain a diluted monomer. The diluted monomer may be used to control the viscosity of the photocurable coating compositions. The diluted monomer may include a low viscosity monomer having at least one functional group, which may be polymerized when exposed to UV rays. For example, a vinyl reactive diluent and a (meth)acrylate monomer diluent may be used. The (meth)acrylate monomer may be identical to the (meth)acrylate monomer contained in the disclosed photocurable coating compositions. A free-radical polymerizable group present in the diluted monomer may react with the free-radical polymerizable group present in the monomer and oligomer contained in the photocurable coating compositions, thus being co-polymerized.

The diluted monomer and the organic solvent may be in the range of from about 1 to about 99 parts by weight based on 100 parts by weight of the overall monomer and oligomer contained in the photocurable coating compositions.

The photocurable coating compositions according to one or more embodiments of the present disclosure may be prepared using a monomer, an organic solvent and a diluted monomer in large amounts may have reduced viscosities. The viscosity of the photocurable coating composition may be less than 20 mPa·s at about 18 to about 20° C. That is, a photocurable coating composition with reduced viscosity may be applied to an article to be coated by dip-coating, spray-coating, and so forth.

The photocurable coating compositions according to one or more embodiments of the present disclosure may further comprise a photo-initiator. Examples of photo-initiators include but are not limited to benzophenone, 2,2-diethoxyacetophenone, benzoin, benzoin alkyl ethers, substituted benzoins, arthraquinone, alkyl substituted anthraquinones, bisdiethyl aminobenzophenone, benzoyl-isopropylether, benzyldimethylketal, dibenzylketones, 1-hydroxy cyclohexylphenylketone, thioxanthone, 1-(4-isopropylphenyl)-2-hydroxyl-2-methylpropane-1-on, 2-hydroxy-2-methyl-1-phenylpropane-1-on, 1-[4-(2-acryloyl ethoxy)-phenyl]2-hydroxydi-2-methyl-1-propane-1-on, diphenyl 2,4,6-trimethylbenzoyl-phosphineoxide, methylbenzoylformate, bis(2,6-dimethoxylbenzoyl)-2,4,4-trimethylphenylphosphineoxide, 2-benzyl-2-dimethylamino-1-(4-morpholinophenyl)-butanone-1, and the like. The amount of the photo-initiator may be in the range of from about 0.001 to about 5 parts by weight based on 100 parts by weight of the photocurable coating composition.

The photocurable coating compositions according to one or more embodiments of the present disclosure may include photo-initiators alone or combination with one or more heat-polymerization initiators. Heat-polymerization initiators include but are not limited to one or more of organic peroxides such as benzoin peroxide, methyl ethyl ketone peroxide, t-butyl hydroperoxide, cumene hydroperoxide, dicumyl peroxide, t-butyl peroxide benzoate and the like or azo compounds such as azobisisobutyronitrile and the like. The heat-polymerization initiators may function as cure promoting agents for the photo-polymerization initiators when the heat-polymerization initiator is used together with the photo-polymerization initiator.

The photocurable coating compositions according to one or more embodiments of the present disclosure may further include a cross-linking agent having a plurality of pendent, ethylenically unsaturated free-radically polymerizable functional groups. These functional groups may be selected from functional groups co-polymerizable with the pendent, ethylenically unsaturated free-radically polymerizable functional groups present in the above monomer and oligomer. Examples of such functional groups include but are not limited to vinyl, vinyloxy, (meth)acryloyl and/or acetylene functional groups, in addition to the functional groups present in the monomer and oligomer. The amount of the cross-linking agent may be in the range of from about 1 to about 10 parts by weight based on 100 parts by weight of the photocurable coating composition. The cross-linking agent include but are not limited to divinylbenzene, triarylisocyanurate, triarylcyanurate, arylmethacrylate, ethyleneglycol dimethylacrylate, and mixtures thereof.

Photo-polymerization may be performed by conventional methods using, for example, a carbon arc lamp, a low pressure mercury vapor lamp, a moderate pressure mercury vapor lamp, a high pressure mercury vapor lamp, a xenon flash lamp, a UV LED, a UV emitting laser, and the like without particular limitation thereof. The ultraviolet ray generating source used for curing the coating composition is the same as that used for conventional ultraviolet curable compositions, for example sunlight, low-pressure mercury-arc lamps, medium-pressure mercury-arc lamps, high-pressure mercury-arc lamps, superhigh-pressure mercury-arc lamps, arc lamps, xenon lamps and the like. Also, as the heating source for heat curing the composition, a hot air blast, nichrome heater wire, infrared ray lamp, far infrared ray heater and the like may be used.

To improve the storage stability, compounds such as p-benzoquinone, hydroquinone, catechol, p-methoxy phenol and the like, may be used as reaction inhibitors. To provide thixotropic properties, the generally known method of adding a small amount of thixotropic filler may be employed. To coat the coating composition, normally practiced methods of dipping, spray flow coating and the like, may be adopted.

To the coating compositions according to one or more embodiments of the present disclosure, cure promoting agents, bubble removing agents, viscosity increasing agents and the like, may be added when required.

The photocurable coating compositions according to one or more embodiments of the present disclosure may have specific properties including, for example: shrinkage of less than 10% by volume, birefringence of less than about $1 \times 10^{-4}$, Tg of not less than 60° C., CIELAB b*value of less than about 1.6, refractive index of about 1.30 to about 1.70, and light transmittance of not less than about 80%. When the composition is left at ambient temperature or an operating: temperature of about 70: to about 120° C. and a relative humidity of not less than about 65% RH for 96 hours, light transmittance is not more than 5%.

The photocurable coating compositions according to one or more embodiments of the present disclosure may contain about 1 to about 99 parts by weight of a monomer diluent are liquids with low viscosities, i.e. not more than about 10 mPa·s, a spraying device may be used to partially or uniformly spread the photocurable coating composition over the entire surface of a wider face of an optical product such as an optical part, an optical device, a light guide, and the like.

In case of a tubular or spherical light, guide, a photocurable acryl resin solution may be filled into a container, and may be applied by dip coating in order to evenly coat a narrow face or the entire surface of the light guide. The same procedure may be adopted for a plate type light guide.

Other than spray or dip coating, various coating methods such as roll coating, knife coating, die coating, and so forth, which are not described in detail herein, may also be used to coat a surface of an optical part, an optical device and/or a light guide.

After applying the photocurable coating composition according to one or more embodiments of the present disclosure onto a surface of an article to be coated, the coated article may be subjected to heating to evaporate diluted monomer, before light irradiation to cure the composition. In order to evaporate the diluted monomer, the article is heated at about 40 to about 80° C. for about 30 seconds to about 5 minutes. The light irradiation may be performed at about 30 to about 810 nm. Alternatively, light irradiation at about 100 to about 350 nm may induce the photocuring reaction. When the coating thickness of the article after curing may be in the range of from about 0.5 to about 100 μm, the light radiation rate may be in the range of from about 10 to about 1,000 mJ/cm³.

For further illustration of various aspects of the present disclosure, several specific examples will now be described. It should be understood however that these examples are for illustrative purposes only, and are not intended to limit the scope of the present disclosure.

PREPARATIVE EXAMPLE 80 parts by weight of methacrylate, 20 parts by weight of 2-ethylhexyl acrylate oligomer, and 70 parts by weight of a mixture including ethyl acetate and ethyl acrylate as a diluted monomer are mixed together and applied to a thermosetting polycarbonate plate having a size of 50 mm×50 mm×3 mm. The diluted monomer is evaporated by heating the coated plate at about 50° C. for about 3 minutes. The coated plate is then subjected to UV irradiation at 320 nm with a radiation rate of 500 mJ/cm³, so as to complete the photocuring process.

EXPERIMENTAL EXAMPLE 1

The thermosetting polycarbonate plate coated using the photocurable coating composition prepared in the PRE-PARATIVE EXAMPLE and an uncoated polycarbonate plate as a control are exposed to a high temperature (80° C.) for 200 hours. The analysis of the visible light transmittance and variation in color coordinate may be performed for both polycarbonate plates and the result are shown in the following Table 1.

TABLE 1

|  |  | Control (thermosetting polycarbonate plate) | Polycarbonate plate prepared in Preparative Example (coating thickness: ≤0.1 mm) |
|---|---|---|---|
| Visible light transmittance | Before test | 82% | 90% |
|  | After test | 78 to 80% | 89.5 to 90% |
| Variation in color coordinate (ΔLab) | Before test | — | — |
|  | After test | 0.6 to 1.2 | 0.4 to 0.9 |

As shown in TABLE 1, the polycarbonate plate coated using the disclosed photocurable coating composition prepared in the PREPARATIVE EXAMPLE exhibits no substantial variation in visible light transmittance and relatively reduced variation in color coordinate, as compared to the control.

EXPERIMENTAL EXAMPLE 2

The thermosetting polycarbonate plate coated using the photocurable coating composition prepared in the PRE-PARATIVE EXAMPLE and an uncoated polycarbonate plate as a control are exposed to a high temperature (60° C.) and a high humidity (80% RH) for 200 hours. The analysis of the visible light transmittance and variation in color coordinate may be performed for both polycarbonate plates and the results are shown in the following Table 2.

TABLE 2

|  |  | Control (thermosetting polycarbonate plate) | Polycarbonate plate prepared in Preparative Example (coating thickness: ≤0.1 mm) |
|---|---|---|---|
| Visible light transmittance | Before test | 82% | 90% |
|  | After test | 32 to 78% | 86 to 89% |
| Variation in color coordinate (ΔLab) | Before test | — | — |
|  | After test | 1.8 to 4.2 | 0.9 to 1.5 |

As shown in Table 2, the polycarbonate plate coated using the photocurable coating composition prepared, in the PRE-PARATIVE EXAMPLE exhibits no substantial variation in visible light transmittance and relatively reduced variation in color coordinate, as compared to the control. Therefore, it was found that the transparency per local part of the plate was uneven after testing.

Visible light transmittance and variation in color coordinate may be slightly altered depending on the thickness and degree of curing of the material. In general, as the material becomes thicker, the effects of temperature and/or humidity are decreased. The material with a higher degree of curing shows reduced effects of temperature and/or humidity. Hence, when the material has increased thickness and a higher degree of curing, the variation in physical properties may be only slightly reduced, while the time and cost required for formation of the shaped products are considerably increased.

EXPERIMENTAL EXAMPLE 3

The thermosetting polycarbonate plate coated using the photocurable coating composition prepared in the PREPARATIVE EXAMPLE and an uncoated polycarbonate plate as a control are positioned at a distance of 0.5 mm or less from a white LED (FCW 301Z, available from Seoul Semiconductor Inc. of Republic of Korea). The time at which thermal deformation or blushing of the white LED occurs is measured over 96 hours. The surface temperature of the used white LED ranged from 120 to 140° C. The measured results are shown in the following Table 3.

TABLE 3

| | Control | Preparative Example (coating thickness: ≤0.02 mm) |
|---|---|---|
| Time at which thermal deformation or blushing occurs (blushing is first observed) | Within 15 minutes | Not occurred |

As shown in Table 3, the results of the lighting test using white LEDs demonstrate that the polycarbonate plate coated with the disclosed photocurable coating composition have superior heat resistance over the uncoated plate.

Figure 1:
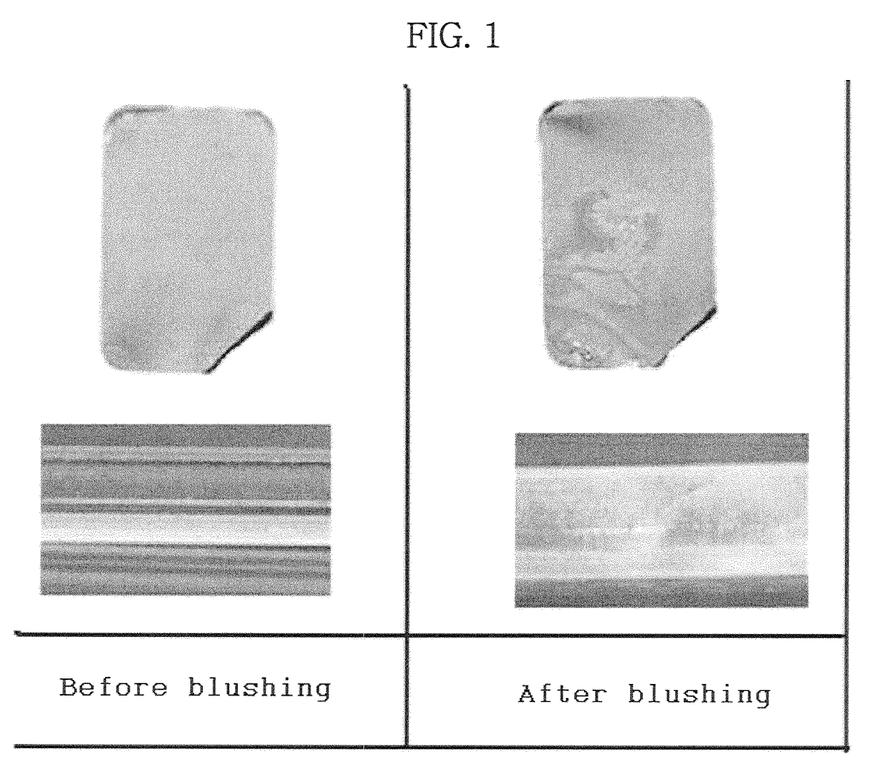
FIG. 1 provides photograph images illustrative of the appearances of a thermosetting polycarbonate before and after blushing at a high temperature.

Blushing refers to a phenomenon wherein a surface of a material is finely cracked, causing diffused reflection of light and resulting in a cloudy surface. FIG. 1 provides illustrative example of photographic images of the surface of a material before and after blushing.

Figure 2:
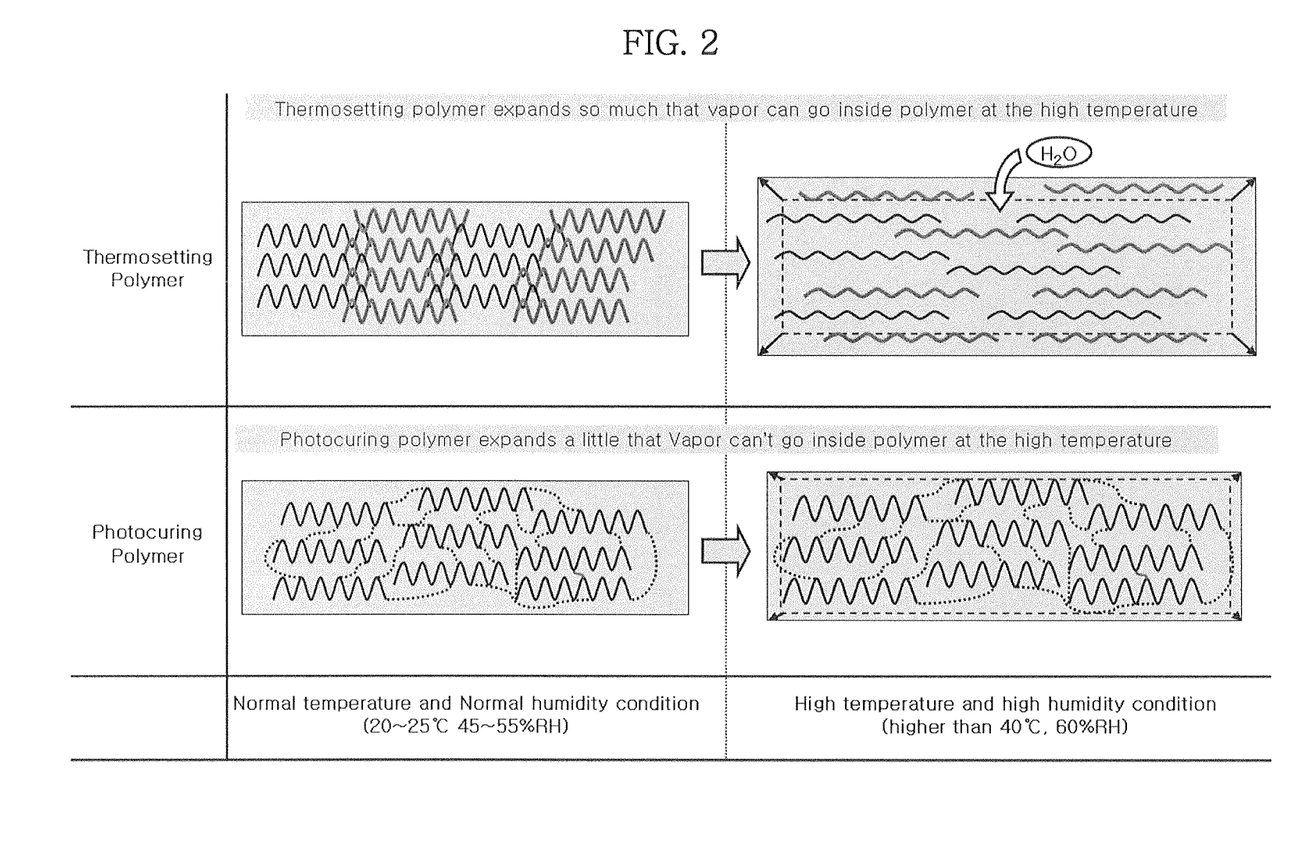
FIG. 2 is a schematic illustration of the effects of high temperature and humidity on the thermosetting polymer and photocuring polymer.

For EXPERIMENTAL EXAMPLES 1 and 2, the phenomena generated in polymer resins at high temperature and humidity may be understood from the schematic views shown in FIG. 2.

For a polymer material, the molecular weight of the material may be larger with an increase number of bonds between the monomers or oligomers. For the same material, when the molecular weight increases, the thermal variation is reduced (that is, the Tg is raised) while mechanical strength is increased (that is, the tensile strength and surface hardness are increased).

EXAMPLE 1

Figure 3:
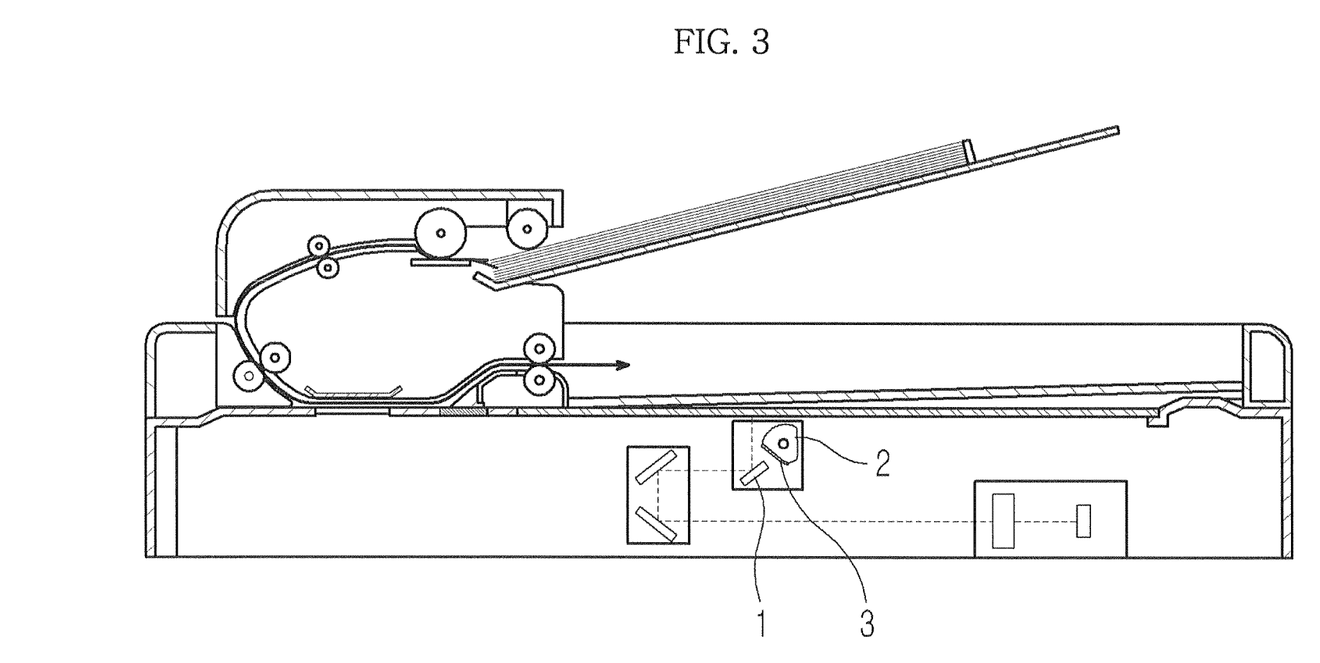
FIG. 3 provides an illustration of a configuration of an image reading device.

A CCD module or a contact image sensor (CIS) module is a device typically found in an apparatus for reading images, for example, a copier, scanner, a facsimile, or the like. Such image sensor of an image reading apparatus may comprise a light source 1 and an optical sensor. In recent years, products using LEDs as the light source for CCD or CIS modules have become available. However, even in such products, a light guide may still be used in order to provide a linear light source (i.e., a line source) as an LED is a point light source. For example, as illustrated in FIG. 3, an example of such image sensor may include a light source, e.g., one or more LEDs 1 and a light guide 2. As the speed at which the image sensors are required to read images becomes faster, increasingly higher light level (or light intensity) of the light, source is becoming necessary, which in turn increases the current or voltage applied to the light source. For a semiconductor device, an increase in the heat dissipation may be attendant the higher power consumption. Known ways in which to address such heat dissipation issues may not be enough for the light intensity that may be necessary in order to satisfy the demand for the ever increasing level of throughput for the reading devices.

For the purposes of illustration, using an LED (for example, a power LED product FCW 301Z available from Seoul Semiconductor Inc. of Republic of Korea), the heat dissipation temperature as a function of the applied current at ambient temperature may be measured. From the measured results, it is found that the temperature is raised to about between 120° C. and 140° C. at 250 mA.

At such a high temperature, it is likely that blushing on the surface of a light guide may occur. In this case, the light loss and/or the variation in light distribution on the surface of the subject document being read may result. Prolonged or repeated exposure to such high temperature may cause the blushing to grow worse over time, or may even cause surface cracks and/or reduced dimensional stability of the light guide. The photocurable coating composition according to one or more aspect of the present disclosure may be applied to, for example, on the two end surfaces, of the light guide.

Figure 4:
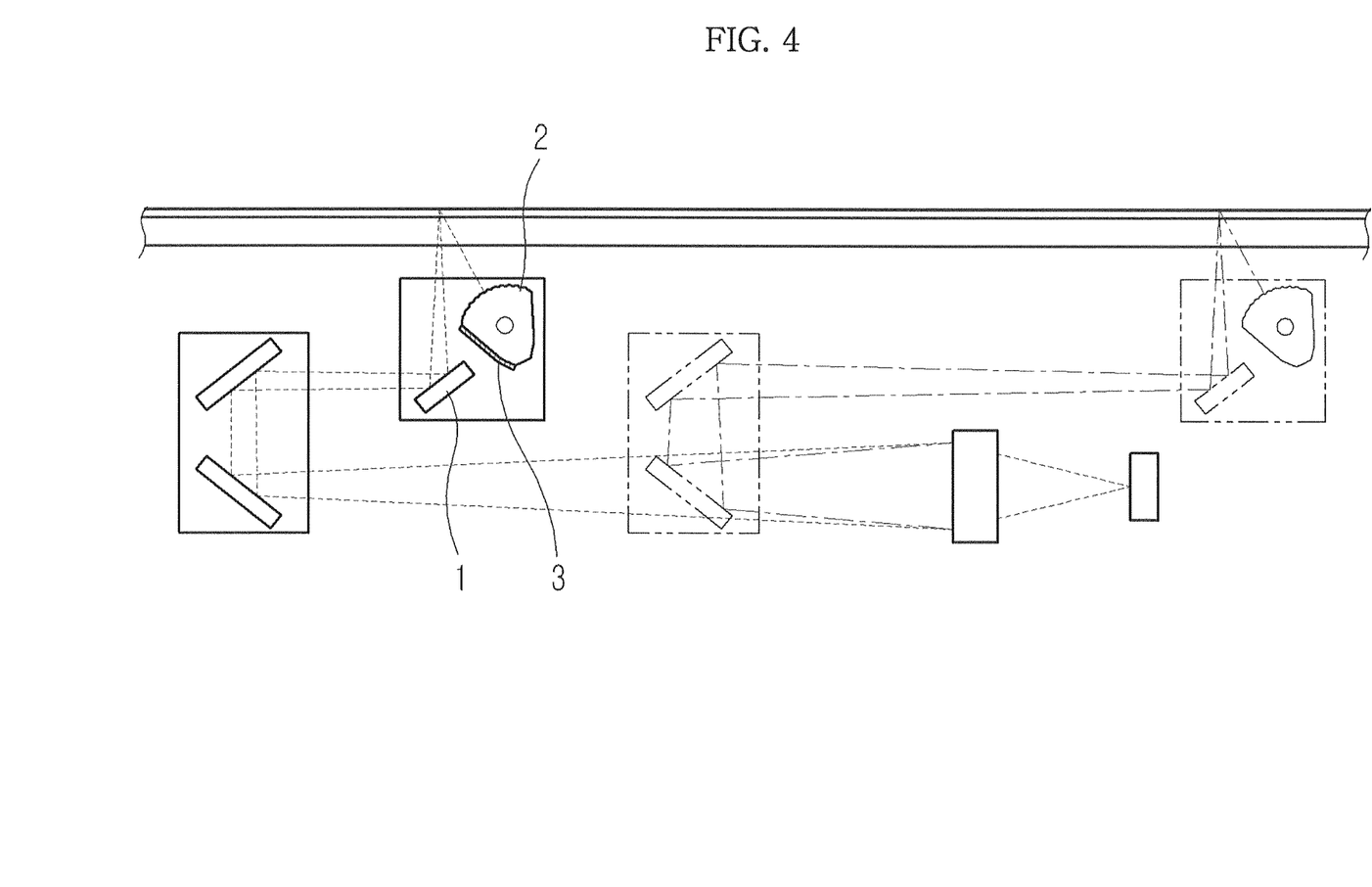
FIGS. 4 and 5 provides an illustration of a light source and a light guide coated according to an embodiment of the present disclosure.

For example, referring to FIGS. 3 and 4, the photocurable coating composition described herein that comprises 55 parts by weight of diluted monomer is applied to the two end surfaces 3 of the light guide 2 that face the LED 1 by dip coating. After drying the coated light guide in a drying oven at 60° C. for 3 minutes, the light guide is subjected to light irradiation at 300 mJ/cm$^3$ using a UV radiator equipped with a mercury lamp as a light source.

Figure 5:
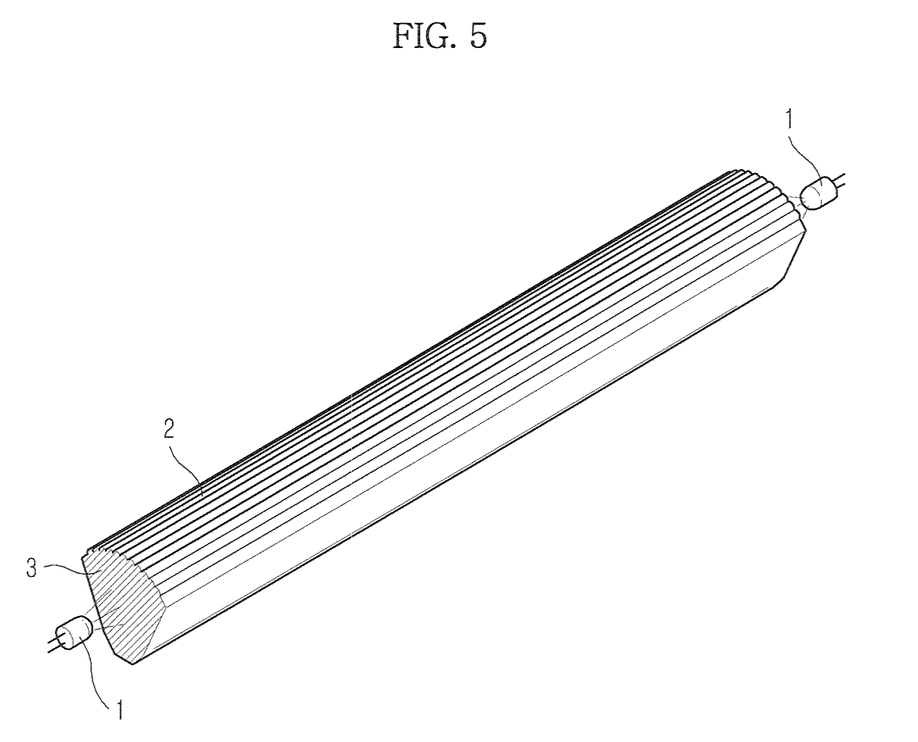

The light guide 2 with its end surface 3 treated with the photocurable coating composition according to one or more embodiments of the present disclosure is arranged on a CCD module, and then, is left for 96 hours under current conditions of applying 250 mA to the LED 1. No blushing or other thermal deformation were observed on the coated surfaces 3. FIG. 5 illustrates another example in which the light guide 2 receives light from two light sources, e.g., LEDs 1, arranged respectively on the two end surfaces 3 of the light guide 2. In such configuration, one or both of the end surfaces may be coated with the photocurable coating composition according to one or more embodiments of the present disclosure.

EXAMPLE 2

In a backlight unit (BLU) of a display apparatus, a point light source such as an LED or a linear light source such as CCFL, HCFL, or the like are used. A light guide panel (LGP) or a diffuse plate is also used for converting the point light source or the linear light source into a planar source. The LGP or diffuse plate may be fabricated using light permeable thermosetting resin such as polymethyl methacrylate (PMMA), Zeoner, polycarbonate (PC), and the like. Problems such as thermal deformation or blushing due to strong heat of the light source on certain parts of the LGP in contact or close proximity with the light source may be encountered.

Figure 6:
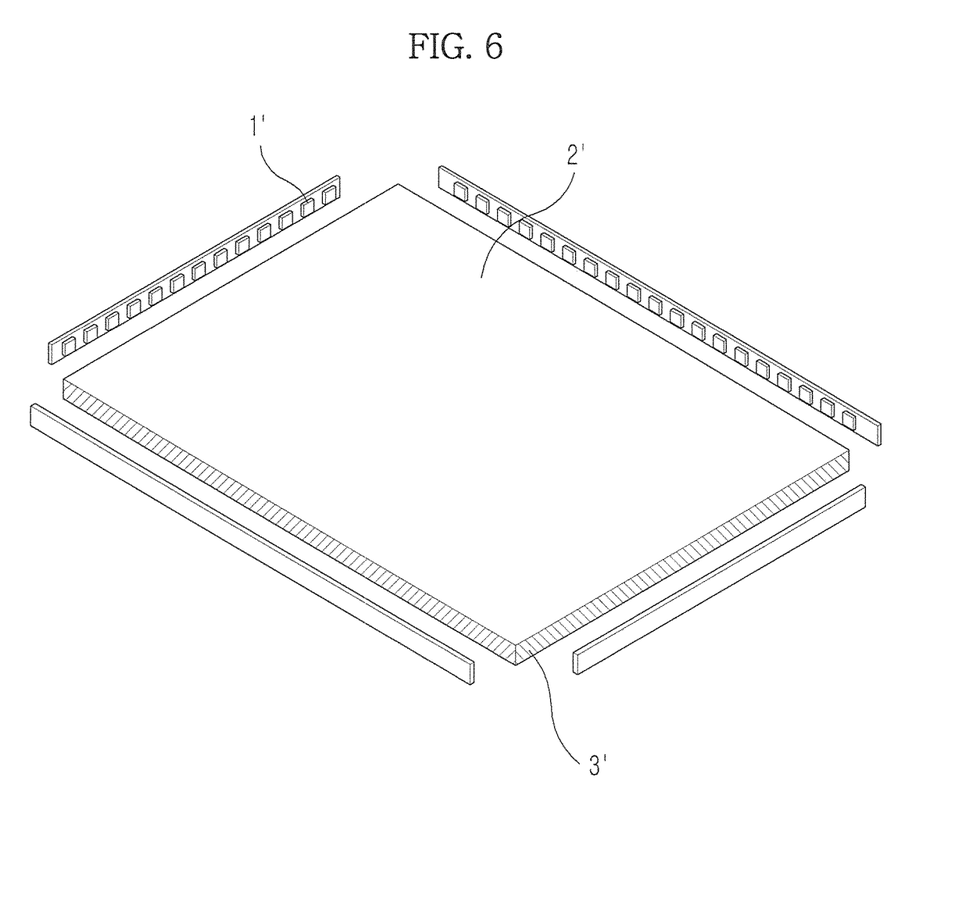
FIG. 6 provides an illustration of a light guide plate face coated according to an embodiment of the present disclosure.

For example, as shown in FIG. 6, if a portion or portions of the light guide panel 2' that are in contact with or in close proximity to a light source 1' such as an LED or CCFL as well as the periphery of the light guide panel are coated using the photocurable coating composition according to one or more embodiments herein to form a coating layer 3' with a thickness of about 3 to about 20 μm, damage of the LGP or diffuse plate caused by heat may be effectively reduced.

While the present disclosure has been particularly shown and described with reference to several embodiments thereof, it will be understood by those of ordinary skill in the art that various changes in form and details may be made thereto without departing from the principles and spirit of the present disclosure, the proper scope of which is defined in the following claims and their equivalents.

What is claimed is:
1. A photocurable coating composition, comprising:
   (a) about 70 to about 99 parts by weight of a (meth)acryloyl monomer;
   (b) about 1 to about 30 parts by weight of a (meth)acryloyl oligomer;
   (c) about 1 to about 99 parts by weight of a mixture of an organic solvent and a diluted monomer which include low viscosity monomer based on 100 parts by weight of the overall (a) and (b) contained within the photocurable coating composition;
   (d) about 0.001 to about 5 parts by weight of a photo-initiator based on 100 parts by weight of (a), (b) and (c); and
   (e) about 1 to about 10 parts by weight of a free-radically polymerizable cross-linking agent based on 100 parts by weight of the photocurable coating composition,
   wherein the (meth)acryloyl oligomer comprises a polymerized monomer unit that comprises:
   (a) about 50 to about 99 parts by weight of a (meth)acryloyl monomer unit that is homo-polymerizable to a polymer having a Tg of not less than about 10° C.;
   (b) about 1 to about 50 parts by weight of a monomer unit having a pendent, free-radically polymerizable functional group; and
   (c) more than 0 parts by weight and less than about 40 parts by weight of a monomer unit that is homo-polymerizable to a polymer having a Tg of less than about 40° C., based on 100 parts by weight of (a) and (b).

2. The photocurable coating composition of claim 1, wherein the (meth)acryloyl oligomer is homo-polymerizable to a small polymer having a Tg of not less than 10° C.

3. A photocurable coating composition, comprising:
   (a) about 70 to about 99 parts by weight of a (meth)acryloyl monomer and urethane monomer mixture;
   (b) about 1 to about 30 parts by weight of a (meth)acryloyl oligomer and urethane oligomer or acryl-urethane copolymerized oligomer;
   (c) about 1 to about 99 parts by weight of a mixture comprising an organic solvent and a diluted monomer which include low viscosity monomer based on 100 parts by weight of (a) and (b); and
   (d) about 0.001 to about 5 parts by weight of photo-initiator based on 100 parts by weight of (a), (b) and (c).

4. The photocurable coating composition of claim 3, wherein the (meth)acryloyl oligomer and urethane oligomer or acryl-urethane copolymerized oligomer includes a polymerized monomer unit, the polymerized monomer unit comprising:
   (a) about 50 to about 99 parts by weight of a (meth)acryloyl monomer unit and urethane monomer unit, both being homo-polymerizable to a polymer having a Tg of not less than 10° C.;
   (b) about 1 to about 50 parts by weight of a monomer unit having a pendent, free-radically polymerizable functional groups;
   and (c) more than 0 parts by weight and less than 40 parts by weight of a monomer unit that is homo-polymerizable to a polymer having a Tg of less than 40° C., based on 100 parts by weight of (a) and (b).

5. The photocurable coating composition of claim 3, wherein the (meth)acryloyl oligomer, the urethane oligomer, the (meth)acryloyl oligomer and urethane oligomer, or the acryl-urethane copolymerized oligomer is homo-polymerizable to a small polymer having a Tg of not less than 10° C.

6. The photocurable coating composition of claim 1 or 3, wherein the composition has a viscosity of less than 20 mPas at about 18 to about 20° C.

7. The photocurable coating composition of claim 1 or 3, wherein the composition has at least one of the following properties when cured: shrinkage of less than 10% by volume; birefringence of less than $1 \times 10^{-4}$; Tg of not less than 60° C.; CIELAB b*value of less than 1.6; refractive index of 1.30 to 1.70; light transmittance of not less than 80%; and light transmittance of not more than 5% when the composition is left at ambient temperature or an operating temperature of 70 to 120° C. and a relative humidity of not less than 65% RH for 96 hours.

8. The photocurable coating composition of claim 1 or 3, wherein the amount of the mixture comprising the organic solvent and the diluted monomer is the range of from about 30 to about 70 parts by weight based on 100 parts by weight of (a) and (b).

9. The photocurable coating composition of claim 1 or 3, wherein the organic solvent has a molecular weight of not more than 500 g/mole.

10. The photocurable coating composition of claim 1 or 4, wherein the monomer unit having a pendent, free-radically polymerizable functional group is prepared by reacting a monomer unit having a reactive pendant functional group with a monoethylenically-unsaturated compound having a co-reactive functional group.

11. The photocurable coating composition of claim 10, wherein the reactive pendant functional group is hydroxyl, secondary amino, oxazolinyl, oxazolonyl, acetylacetonyl, carboxyl, isocyanato, epoxy, aziridinyl, icyloyl halide or cyclic anhydride.

12. The photocurable coating composition of claim 3, further comprising about 1 to about 10 parts by weight of a free-radically polymerizable cross-linking agent based on 100 parts by weight of the photocurable coating composition.

13. The photocurable coating composition of claim 12, wherein the cross-linking agent is divinylbenzene, triarylisocyanurate, triarylcyanurate, arylmethacrylate or ethyleneglycol dimethylacrylate.

14. A light guide having at least one face coated with the photocurable coating composition as set forth in claim 1 or 3.

* * * * *

UNITED STATES PATENT AND TRADEMARK OFFICE
CERTIFICATE OF CORRECTION

| | | |
|---|---|---|
| PATENT NO. | : 9,133,361 B2 | Page 1 of 1 |
| APPLICATION NO. | : 12/642287 | |
| DATED | : September 15, 2015 | |
| INVENTOR(S) | : Kim et al. | |

It is certified that error appears in the above-identified patent and that said Letters Patent is hereby corrected as shown below:

On the title page

Column 2, OTHER PUBLICATIONS, Line 2

Delete "Retreived" and insert --Retrieved--, therefor.

In the claims

Claim 10, Column 14, Line 23

Delete "120°. C." and insert --120° C.--, therefor.

Claim 10, Column 14, Line 36

Delete "pendant" and insert --pendent--, therefor.

Claim 11, Column 14, Line 40

Delete "pendant" and insert --pendent--, therefor.

Claim 11, Column 14, Line 42

Delete "icyloyl halide" and insert --acryloyl halide--, therefor.

Signed and Sealed this
Eighth Day of December, 2015

Michelle K. Lee
*Director of the United States Patent and Trademark Office*